(No Model.)

H. GAWLEY.
SAWMILL DOG.

No. 562,461. Patented June 23, 1896.

Witnesses
C. Nondelink
Ambrose C. Hindman

Inventor
Hector Gawley
By Edward Taggart
His Attorney

UNITED STATES PATENT OFFICE.

HECTOR GAWLEY, OF GRAND RAPIDS, MICHIGAN, ASSIGNOR TO MERCY P. MONTGOMERY, OF SAME PLACE.

SAWMILL-DOG.

SPECIFICATION forming part of Letters Patent No. 562,461, dated June 23, 1896.

Application filed May 27, 1895. Serial No. 550,858. (No model.)

*To all whom it may concern:*

Be it known that I, HECTOR GAWLEY, a citizen of the United States, residing at the city of Grand Rapids, in the county of Kent and State of Michigan, have invented certain new and useful Improvements in Sawmill-Dogs, of which the following is a specification.

This invention relates to certain new and useful improvements in sawmill-dogs; and the invention consists in the arrangement, upon a suitable knee or framework, of a series of dogs containing long and short points so arranged that by moving the lever or handle in one direction the long points or dogs can be used, and by moving the handle in another direction the short points or dogs can be used, thereby adapting my improved dog to be used upon a rough log or upon a cant.

It also refers to the arrangement of the dogs on the outside of the knee, thereby making the dog much more convenient to manipulate and to detach and attach the same; and the objects of my invention are, first, to construct a dog which can be worked readily and quickly in dogging a log, and which can be quickly and readily changed to dog a cant; second, to arrange the lever with reference to the dogs so that the log is dogged by throwing the lever upwardly, and if the lever is thrown down when the log is cut up it will merely sheathe the dogs and prevent injury to the saw, and third, other objects hereinafter described, and pointed out in the specification and claims. These objects I accomplish by means of the mechanism illustrated in the accompanying drawings, in which—

Figure 1:
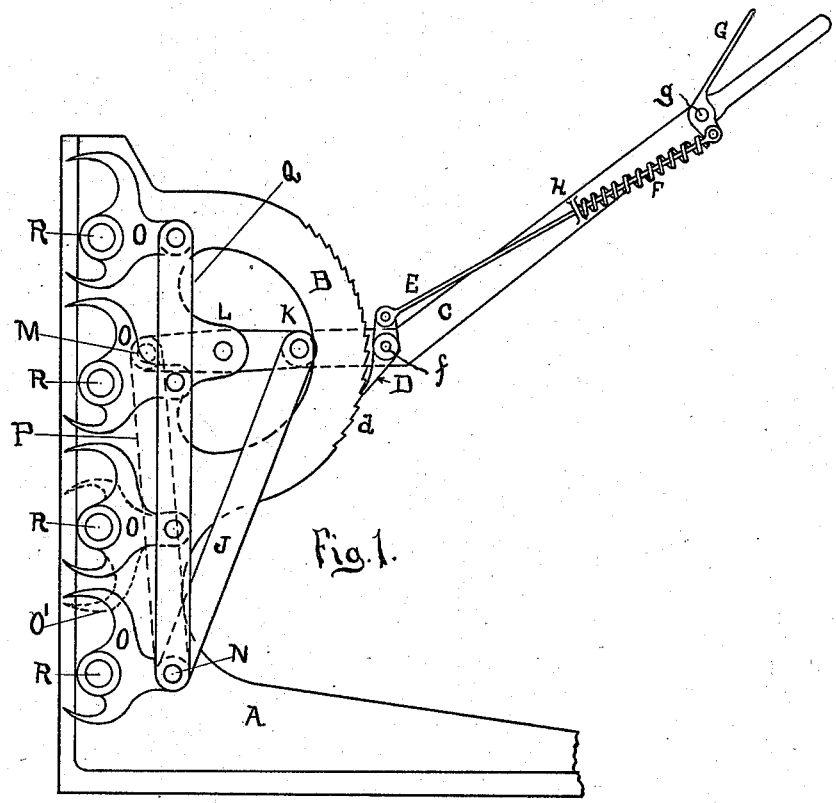
Figure 2:
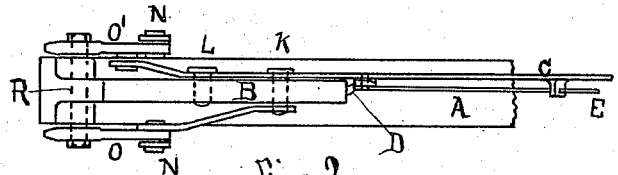

Figure 1 is a side elevation of my improved dog with the handle at a neutral point, that is, so that neither the long nor short dogs are in position to dog a log or cant; and Fig. 2 shows a plan view of the same with the handle in the same position.

Similar letters refer to similar parts throughout both the views.

A represents the knee, which may be applied to the ordinary head-block of a carriage. This knee supports the dogs and mechanism for operating the same, the points of the dogs showing the face of the knee which is brought in contact with the log.

B is a quadrant provided with a series of notches or ratchet-teeth with which the dog D is adapted to engage in order to retain the dogs and connected mechanism in proper position when the lever is thrown up.

*d* shows the notches in the quadrant B.

C is the hand-lever, which is pivoted to the knee at the point L, on which it turns as a fulcrum. The dog D is pivoted to C, and is provided with a connecting or operating rod E, which is provided with a compression-spring F, which spring is adapted to hold the dog D in engagement with the notches *d* of the quadrant.

H is a stop or abutment against which the spring F presses in order to hold the dog D in engagement.

G is a handpiece pivoted to the lever C at *g*, and adapted to raise the dog D out of engagement with the notches *d*.

*f* is the pivot on which the dog D is adapted to turn.

The lever C has a connecting rod or bar J, pivotally connected to C at the point K, and also pivoted at the point N to the lower dog O, and also to the connecting-bar Q, said connecting-bar Q being attached to all the dogs on one side of the knee.

P is a connecting-bar attaching the dogs O', which are on the opposite side of the knee, the same connecting-rod P being pivoted at the point N at one end and at the point M to the lever C at the other end, the lever C turning upon L as a fulcrum.

R are the pivots for the dogs O and O'.

By this construction, when the lever C is raised the dogs O are turned so that their long points pass outwardly and downwardly into the log, while the long points of the dog O' pass outwardly and upwardly into the log, and when the log is sufficiently dogged or held by the bite of the dogs, the dog D engages with the notches *d* and retains the lever C in its raised position and the log securely dogged.

By reversing the motion of the lever, as is done in case a cant is to be dogged, the shorter teeth or points on the dogs O and the shorter points on the dogs O' are carried out so as to dog the cant.

I prefer to use the long points of the dogs with the upward movement of the lever; but it is evident that the structure may be reversed without departing from the spirit of my invention.

Having thus described my invention, what I claim to have invented, and desire to secure by Letters Patent, is—

1. In a sawmill-dog, the combination of two series of dogs, each dog having an upper and a lower tooth, the dogs in one series having the upper teeth the longer, and the dogs in the other series having the lower teeth the longer, and a lever operating to simultaneously project either the long or short teeth of both series of dogs, substantially as described.

2. In combination with a knee or support, two series of dogs pivoted on the opposite sides of the knee and each dog having two teeth of unequal length, the two series of dogs being reversely arranged as shown, and the dogs in each series being connected together, a hand-lever, and connecting-rods connecting each series of dogs with said hand-lever, whereby said dogs are operated simultaneously by said hand-lever, substantially as described.

3. In combination with two series of dogs, each dog having a longer and a shorter tooth, a lever pivoted to the knee having a connecting-rod between the lever and one series of dogs, and a connecting-rod between the lever and the other series of dogs, said connecting-rods being connected to the main lever on opposite sides of the fulcrum, substantially as described.

In witness whereof I have hereunto set my hand and seal in the presence of two witnesses.

HECTOR GAWLEY. [L. S.]

Witnesses:
EDWARD TAGGART,
CHRISTOPHER HONDELINK.